June 18, 1957 L. P. THOMAS 2,796,462

AUTOMATIC GAIN CONTROL CIRCUITS WITH HUM COMPENSATION

Filed March 19, 1952 2 Sheets-Sheet 1

INVENTOR
Lucius P. Thomas
BY
[signature]
ATTORNEY

AUTOMATIC GAIN CONTROL CIRCUITS WITH HUM COMPENSATION

Filed March 19, 1952 2 Sheets-Sheet 2

INVENTOR
Lucius P. Thomas
BY
[signature]
ATTORNEY

1

2,796,462

AUTOMATIC GAIN CONTROL CIRCUITS WITH HUM COMPENSATION

Lucius P. Thomas, Collingswood, N. J., assignor to Radio Corporation of America, a corporation of Delaware Application March 19, 1952, Serial No. 277,426

3 Claims. (Cl. 178—7.3)

This invention relates to gain control circuits and more particularly it relates to automatic gain control circuits operable from repetitive pulses such as horizontal synchronizing pulses developed in the video circuits of a television receiver.

Automatic gain control circuits operable from the reoccurring synchronizing pulses in a television receiver provide a gain control voltage which closely follows changes in signal level if the circuit constants have a fast enough time constant to allow the gain control potential to follow the envelope of the synchronizing pulses. In order to provide the necessary fluctuating direct current necessary for the AGC operation from the synchronizing pulses an integrating filter network is necessary having a time constant long with respect to the reoccurrence frequency of the horizontal synchronizing pulses. Since the frequency of the synchronizing pulses is 15,750 cycles in the standard television transmission signal, an integrating network having a long time constant for this frequency would be highly satisfactory in operation for permitting the AGC potential to follow the synchronizing signal envelope. Such a circuit is fast enough acting to provide good control in presence of airplane flutter or like signal variations and yet has a large enough time constant to be relatively unaffected by noise impulses which occupy small time intervals and have little relative energy as compared with the horizontal synchronizing pulse energy.

In AGC circuits operable from synchronizing pulses, however, the integrating network will have a large output variation during the time period in which the equalizing and vertical synchronizing pulses occur. This results in a large 60 cycle hum component in the AGC potential if a long time constant integrating network with respect to 60 cycles is not utilized. With a longer time constant circuit, however, there is relatively poor AGC action provided because of the inability of the circuit to follow variations of the signal envelope at a faster rate than the 60 cycle vertical synchronizing component. Accordingly, it has in the past been an inconsistent requirement to provide both more adequate filtering and faster time constant AGC circuit.

In addition, when AGC amplifiers are used with discharge current obtained from pulse energy available in the horizontal deflection circuits, this energy varies with changes in the vertical deflection circuit due to changes in kinescope brightness level or the like.

It is accordingly an object of the present invention to provide improved automatic gain control circuits.

It is another object of the invention to provide automatic gain control circuits having faster time constant integrating networks.

It is a further object of the invention to provide circuits for developing automatic gain control potentials in which there is little superimposed hum due to vertical synchronizing pulse energy or the like.

It is a still further object of the invention to provide automatic gain control circuits operable with pulses derived from a horizontal deflection circuit in which the

2

AGC output level is relatively independent of changes of load in the deflection circuit.

In accordance with the invention therefore there is provided an automatic gain control amplifier circuit having an integrating filter network with a time constant suitable for filtering wave energy having frequency components in the general frequency range of the horizontal pulses, and therefore providing quick acting automatic gain control. To eliminate or reduce the hum which would otherwise be superimposed upon the AGC output potential a degenerative frequency selective balancing network is connected from a portion of the integrating filter circuit to the automatic gain control amplifier input terminal. Accordingly, the hum component is effectively balanced out and the automatic gain control potential is established primarily by the modulation or signal level envelope of the horizontal synchronizing pulses.

A detailed description of the invention and its mode of operation together with additional objects and features of advantage will be found throughout the following description. A more clear understanding of the invention will be afforded if the description is considered in connection with the accompanying drawing in which.

Figure 1:
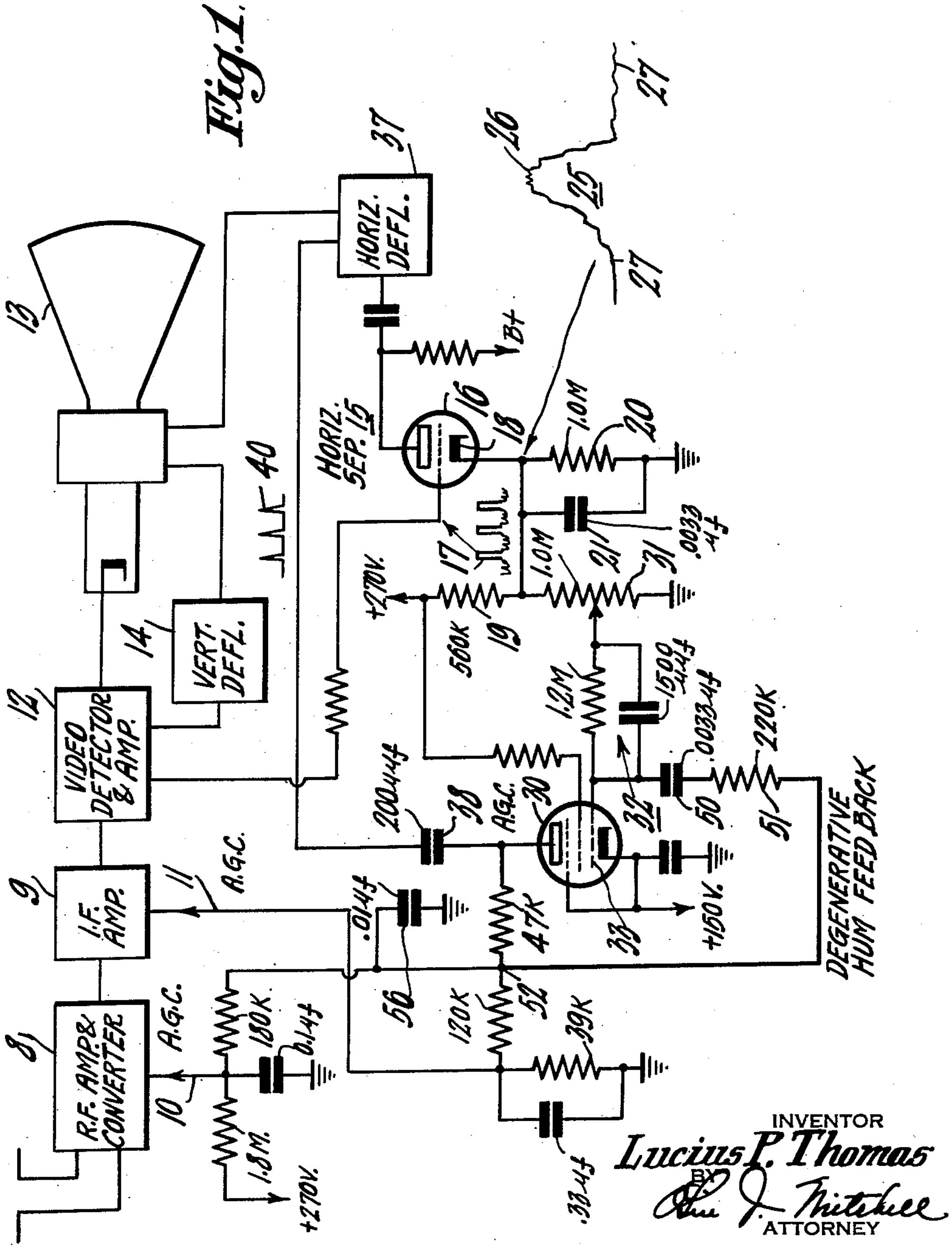
Figure 1 is a combined schematic and block circuit diagram of a television receiver embodying the invention.

Throughout the respective figures block diagrams are utilized to represent circuit elements which may of themselves be entirely conventional and whose details are not part of the invention, whenever possible, so that the nature of the present invention might be more readily ascertained. To facilitate comparison throughout the respective views, like component parts will be designated with like reference characters.

Referring now particularly to the television receiver circuit of Figure 1, the circuit elements peculiar to the present invention are shown schematically. Those circuits shown in block diagram are representative of a conventional receiver with which the circuits of the invention may be associated advantageously. Thus both a radio frequency amplifier circuit 8 and an intermediate frequency amplifier channel 9 are adapted for automatic gain control by means of a potential at the respective input leads 10 and 11. The video detector and amplifier circuit 12 provides a suitable composite video signal for operation of the kinescope 13 or other picture reproducer and for operation of the vertical deflection circuit 14 and a horizontal synchronizing separator circuit 15.

At the horizontal separator tube 16 the incoming composite video signal 17 arrives with the synchronizing pulses extending in a positive direction. Separation is effected by means of a cutoff bias for the lower potential video portions of the signal comprising a positive potential in the order of 150 volts developed at the cathode 18 by means of the voltage divider resistors 19 and 20. The cathode circuit of the horizontal separator tube 16, including the resistor 20 and parallel capacitor 21, has a time constant which is long as compared with the horizontal synchronizing pulse frequency but short as compared to the vertical synchronizing pulse frequency. Thus, at the cathode is developed a waveform 25 which has a reoccurring peak 26 during the intervals when the incoming vertical synchronizing pulse arrives thereby tending to contribute a strong hum component to AGC potentials derived therefrom. The signal level of the horizontal synchronizing pulse envelope is closely followed by those portions of the waveform intermediate the vertical synchronizing pulse peaks 26, however, and when the hum is eliminated the waveform is highly suitable for operation of an automatic gain control amplifier.

A suitable portion of the horizontal separator tube cathode potential waveform 25 is taken for an input signal to the AGC amplifier tube 30 by means of the potentiometer 31 shunting the cathode resistor 20. A further integrating and decoupling circuit 32 is provided so that the input potential on the grid 33 of the AGC amplifier tube 30 is essentially a direct current and any variations due to noise pulses are minimized. A pulsating potential source providing waveform 40 is connected for supplying discharge potential to the tube 30 from the horizontal deflection circuit 37 by way of capacitor 38, to provide a negative output potential suitable for automatic gain control without the provision of a separate negative potential power supply. Because of the high amplitude of the input pulse 40, the tube may readily be operated with the cathode at a positive potential of about 150 volts to correspond to the direct current potential level of the grid circuit, which is in the same order of magnitude. This pulsing means of providing discharge current for the AGC amplifier tube is well known in the art.

Briefly, in operation the high positive pulses, which are synchronous with the horizontal synchronizing pulses, cause a pulsating anode current to flow in the tube 30 when the grid 33 is above cutoff potential. In this particular circuit the grid circuit 33 is normally operating in the conducting region of the tube so that changes in signal level may change the amount of averaged output current provided by the pulses 40 arriving from the horizontal deflection circuit. Suitable integrating networks are provided in the direct current conduction or discharge path of the amplifier tube 30, so that the output pulses are filtered to provide AGC potentials for operation of the R. F. and I. F. amplifiers at the respective terminals 10 and 11.

Since the conduction level of amplifier tube 30 is dependent upon the direct current on the grid 33, the signal peaks 26 caused by the vertical synchronizing pulses provide a strong hum component in the integration network connected to the anode of the amplifier tube 30. This hum has heretofore been reduced by providing long time constant integrating filter networks thereby compromising with the requirements for a fast acting AGC potential. In order to obtain the advantage of the quickly changing signal potential envelope available in the waveform 25 these circuits preferably have a fast enough time constant so that only waves having amplitude peaks occurring at those frequencies in the order of the horizontal synchronizing pulse frequency are filtered or levelled out to provide the direct current control potential.

In accordance with the present invention, therefore, a degenerative hum feedback circuit 50 and 51 is connected between the terminal 52, at an intermediate position on the integration filter circuit in the anode circuit of tube 30, and the grid input terminal 33. The feedback circuit, by means of capacitor 50, allows alternating current variations from the anode circuit to be degeneratively inserted at the grid 33. The size of the capacitor is so chosen that the 60 cycle hum frequency in the AGC circuit due to the vertical synchronizing peaks 26 on waveform 25 is essentially balanced out. Very little of the horizontal frequency component will be present at terminal 52 for cancellation in this embodiment because the integrating action of resistor 55 and capacitor 56 already has reduced the pulses to a direct current with little energy at the horizontal frequency.

Because the lower frequency hum signals are balanced out by the feedback network, the time constants of the filter network may be made very much faster than heretofore possible. Highly improved AGC action is therefore provided in the presence of airplane flutter and variations in the level of the incoming video signal.

In choosing the value of capacitor 50 for the proper amount of feedback potential to eliminate hum, the hum at the video amplifier output lead may be observed and the capacitor 50 chosen until the hum is minimized. It may be necessary in some circumstances to use a resistor 51 in series with capacitor 50 in the feedback circuit in order to phase the hum feedback for optimum cancellation. Since the compensation is preferably made for the entire receiver circuit, rather than in the AGC circuit alone, the size of the resistor and capacitor will vary considerably and may not be accurately designated with a fixed impedance value. The cancellation of hum in the receiver is so effective, however, that the long time constant decoupling networks formerly necessary in the grid circuit of amplifier stages controlled by the automatic gain potential, which even further increases the overall AGC time constant, need not be provided. Therefore in accordance with the present invention improved television receiver operation is afforded. Some filtering may still be necessary in the I. F. and R. F. amplifier grid circuits in order to prevent noise pulses from exciting current flow in the AGC circuit which will cause white streaks in the picture. Also a filter is desirable to prevent differences in cut off potentials of the controlled tubes from causing hum when strong signals arrive driving the tube into grid current. Thus the grid impedance may be kept low in accordance with the invention.

The described invention also enables a faster AGC time constant operation easily obtainable with small paper capacitors rather than large electrolytic type capacitors. Accordingly, greater circuit stability may be attained.

Figure 2:
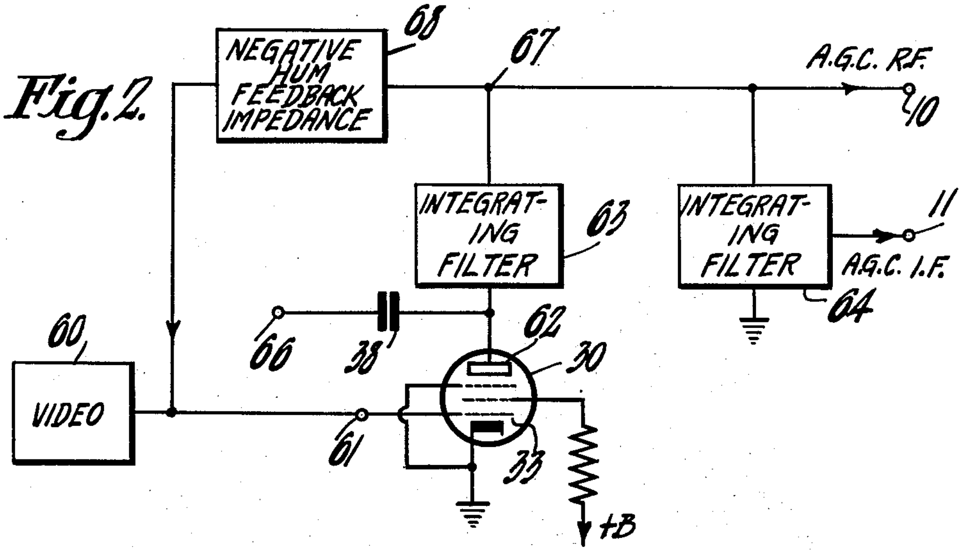
Figure 2 is a simplified block circuit diagram of an AGC circuit constructed in accordance with the invention.

The simplified diagram of Figure 2 indicates the basic circuit construction incorporated in television receiver circuits embodying the invention. Thus a video or synchronizing input circuit 60 or other suitable source of signals variable in amplitude in accordance with signal level changes is connected to the input terminal 61 of an AGC amplifier tube 30. An integrating filter network is connected to the anode 62 or output terminal of the amplifier tube 30 which comprises two sections 63 and 64 for providing at the AGC output terminals 10 and 11 potentials suitable for operation of the radio frequency and intermediate frequency circuits respectively. A suitable pulsing potential source terminal 66 coupled to the anode 62 provides a pulsating discharge current flow which is converted in the integrating filter networks to a negative direct current AGC potential. Connected at the terminal 67 in the integrating filter circuit is the negative hum feedback impedance 68 which provides frequency selective cancellation of hum remaining in the gain control output potential at terminal 67 after partial integration by the first portion of the filter network 63.

Figure 3:
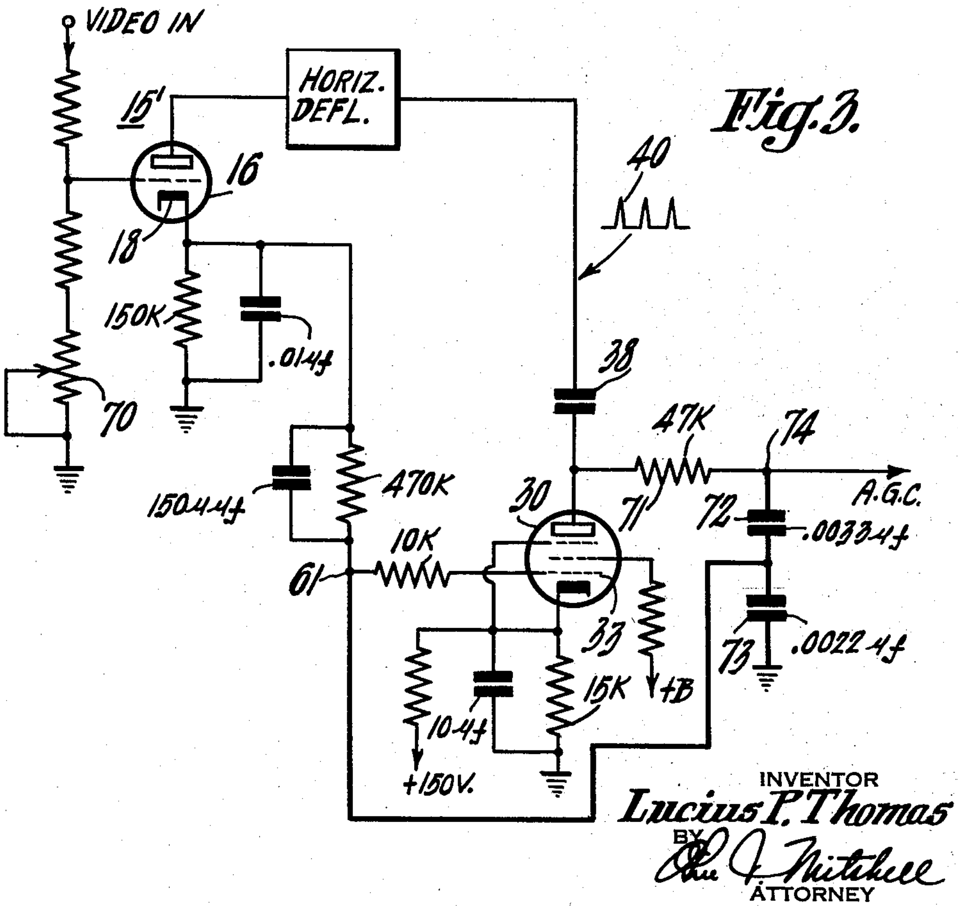
Figure 3 is a circuit diagram of an automatic gain control circuit constructed in accordance with a further modification of the invention.

Figure 3 is a schematic diagram of a circuit operable in accordance with the further phase of the invention to additionally cancel out any change of automatic gain control potential with loading of the horizontal deflection circuit 37 from which the discharge potential of the AGC amplifier tube 30 is obtained. Because the potential at the cathode 18 of the separator tube 16 is essentially direct current obtained from the cathode follower action of the separator tube, the AGC level may be set by means of a variable resistance 70 in the grid input circuit of the separator tube 16, rather than a potentiometer shunting the cathode circuit. This provides operation of the AGC amplifier tube 30 at a higher input signal level than in the previously described circuit of Figure 1, because shunt circuit losses are eliminated, and is preferred if the synchronizing separator circuit 16 is of the type where the variation in grid input impedance is tolerable.

Operation of the AGC amplifier is effectively the same as Figure 1 with those exceptions noted in the following discussion. The output integrating filter network comprises the series connected resistor 71 and capacitors 72 and 73. The series capacitors 72 and 73 effectively bypass the horizontal frequency components remaining at terminal 74 and thereby provides the desired AGC potential. Capacitor 72 is chosen to provide the desired hum feedback component to terminal 61 to effect hum cancellation as hereinbefore described. In addition enough horizontal impulse potential is developed across capacitor 73 to provide a feedback component at this frequency. As a result there is cancellation or degeneration of any changes of AGC potential at the output terminal 74 with variations in the level of the horizontal deflection pulses 40, which are utilized to provide anode current in the amplifier tube 30. Therefore the AGC potential does not vary with changes in kinescope brightness or other loading conditions reflected into the horizontal deflection circuit 37. This embodiment therefore provides further improved operation of the automatic gain control circuits.

Therefore the present invention provides the combination of an automatic gain control circuit and a frequency selective degenerative feedback network for providing hum free AGC potential and a more desirable quick acting time constant in the integrating filter network necessary when AGC potentials are derived from the peak detection of re-occurring synchronizing pulses.

Therefore having described circuit embodiments illustrating the mode of operation of the invention, those features believed descriptive of the nature of the invention are defined with particularity in the appended claims.

What is claimed is:

1. In a television receiver apparatus requiring a direct current automatic gain control voltage having substantially no alternating current component attributable to causes other than variations in the intensity of received television radio carriers, the combination of: a source of demodulated television signal having a direct current component and periodically recurrent vertical and horizontal synchronizing pulse components of an amplitude corresponding to a fixed modulation percentage of received television radio carriers such that the amplitude of the periodically recurrent pulses comprising said pulse components is a measure of the intensity of received television radio carriers, said vertical synchronizing pulses having a duration and period of recurrence substantially longer than that of said horizontal synchronizing pulses; amplifier means having an input circuit and an output circuit; means direct current coupling said input circuit to said signal source for driving said amplifier with demodulated television signal representations; means operatively coupled with said amplifier permitting conduction therein substantially only during the intervals defined by each of the synchronizing pulses comprising said periodically recurrent synchronizing pulse components; galvanically conductive electrical signal integrating means operatively coupled with said output circuit, said integrating means having an effective time constant of a magnitude greater than the period of said horizontal synchronizing pulses but substantially shorter than the period of said vertical synchronizing pulses to develop a direct current signal at the output of said integrating means representing the amplitude of horizontal synchronizing pulses but containing an undesired alternating current signal component having a period corresponding to the period of said vertical synchronizing pulses; and a feedback impedance means connected between said input circuit and the output of said integrating means, the impedance value of said impedance means being so related to said input and output impedances as to establish degenerative feedback in said amplifier means at the frequency of said vertical synchronizing pulses to an extent substantially limiting said undesired alternating current signal component appearing in the output of said integrating means whereby the direct current signal appearing at the output of said integrating means is rendered suitable for use as an automatic gain control potential for said receiver.

2. In a television receiver apparatus requiring a direct current automatic gain control voltage having substantially no alternating current component attributable to causes other than variations in the intensity of received television radio carriers, the combination of: a source of demodulated television signal having a direct current component and vertical and horizontal synchronizing pulse components, each of said pulse components comprising periodically recurrent pulses of an amplitude corresponding to a fixed modulation percentage of a received television radio carrier such that the amplitude of said pulses constitutes a measure of the intensity of a received television radio carrier, said vertical synchronizing pulses having a duration and period substantially longer than that of said horizontal synchronizing pulses; amplifier means having an input and an output circuit; means direct current coupling said input circuit to said signal source for driving said amplifier with demodulated television signal representations; means operatively coupled with said amplifier means permitting conduction therein only during the intervals defined by each of the pulses comprising said periodically recurrent synchronizing pulse components; means coupled with said signal source and responsive to said horizontal synchronizing pulses to produce a pulse train corresponding in timing to said horizontal synchronizing pulses; means operatively coupling said pulse train to the output of said amplifier so as to produce current pulses in said amplifier and said output circuit corresponding to said pulse train to provide an average current flow in said output circuit of a magnitude causing the development in said output circuit of a control voltage the average magnitude of which is suitable for use as an automatic gain control voltage but which otherwise contains undesired alternating current variations corresponding in frequency to said horizontal and vertical synchronizing pulses; time constant means included in said output circuit so connected thereto to produce an integrating influence upon variations in said control voltage, said time constant means having a time constant value shorter than the period of said vertical synchronizing pulses but longer than the period of said horizontal synchronizing pulses, so that an undesired alternating current component corresponding to said vertical synchronizing pulses tends to remain in said developed control voltage; and a frequency selective feedback means connected in degenerative relationship between said input and output circuits and so valued relative to said input and output circuit impedances as to feed back said undesired alternating current component in phase opposition to vertical synchronizing pulse representations appearing in said input circuit so as to degeneratively reduce the amplitude of said remaining undesired alternating current component appearing in said control voltage to render it suitable for use in an automatic gain control voltage.

3. In a television receiver apparatus requiring a direct current automatic gain control voltage having substantially no alternating current component attributable to causes other than variations in the intensity of received television radio carriers, the combination of: a source of demodulated television signal having a direct current component and vertical and horizontal synchronizing pulse components, each of said pulse components comprising periodically recurrent pulses of an amplitude corresponding to a fixed modulation percentage of a received television radio carrier such that the amplitude of said pulses constitutes a measure of the intensity of a received television radio carrier, said vertical synchronizing pulses having a duration and period substantially longer than that of said horizontal synchronizing pulses; a pulsed automatic gain control voltage developing circuit comprising an amplifier having input and output electrodes as well as a common electrode operatively referenced to said input and output electrodes; galvanically conductive impedance means operatively connected between said control electrode and common electrode to define an input circuit; resistance means galvanically connected between said output electrode and said common electrode to define an output circuit; means operatively coupled with said source of demodulated television signal and responsive to the horizontal synchronizing component of received television signals to develop a pulse train corresponding in timing to said horizontal synchronizing pulses; capacitance means operatively coupling said pulse train developing means to said amplifier so that said pulse train is capacitively applied between said output electrode and said common electrode to establish pulsed current flow in said output circuit, the magnitude of which is defined by the potential of said input electrode relative to said common electrode; means operatively coupling said television signal source to said input circuit for controlling the magnitude of average current in said output circuit as a function of the amplitude of received synchronizing pulses; a capacitor connected between a point in said output circuit and said common electrode, the value of said capacitor being so related to the resistance of said output circuit to define a time constant in said output circuit the value of which is shorter than the period of said vertical synchronizing pulses but longer than the period of said horizontal synchronizing pulses so that there is developed a direct current control voltage in said output circuit of an average value suitable for use as an automatic gain control voltage in said receiver but containing an undesired alternating current component corresponding to the period of said vertical synchronizing pulses; and a capacitor operatively connected between said output circuit and said input circuit, said capacitor having a value establishing substantially degenerative feedback between said input and output circuits so that alternating current variations in said developed control potential are degeneratively reduced.

References Cited in the file of this patent

UNITED STATES PATENTS

| | | |
|---|---|---|
| 2,208,927 | Hefele | July 23, 1940 |
| 2,259,998 | Brown | Oct. 21, 1941 |
| 2,531,935 | Doelz | Nov. 28, 1950 |
| 2,632,802 | Vilkomerson et al. | Mar. 24, 1953 |
| 2,636,939 | Wissel et al. | Apr. 28, 1953 |
| 2,673,892 | Richman | Mar. 30, 1954 |
| 2,697,756 | Bessire | Dec. 21, 1954 |

OTHER REFERENCES

Rider's Television Manual, vol. 8, Stromberg-Carlson TV, page 8-7, Nov. 26, 1951.